United States Patent
Tanoue et al.

(10) Patent No.: US 6,233,597 B1
(45) Date of Patent: *May 15, 2001

(54) COMPUTING APPARATUS FOR DOUBLE-PRECISION MULTIPLICATION

(75) Inventors: Kazufumi Tanoue, Osaka; Hideyuki Kabuo, Kyoto; Ryutaro Yamanaka, Yokohama, all of (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/110,966

(22) Filed: Jul. 7, 1998

(30) Foreign Application Priority Data

Jul. 9, 1997 (JP) .................................................. 9-183880

(51) Int. Cl.[7] .................................................. G06F 17/52
(52) U.S. Cl. ............................................................... 708/625
(58) Field of Search .............................. 708/625, 628–632

(56) References Cited

U.S. PATENT DOCUMENTS

| | | | |
|---|---|---|---|
| 4,722,068 | 1/1988 | Kuroda et al. | 708/625 |
| 4,754,421 * | 6/1988 | Bosshart | 708/625 |
| 4,809,212 * | 2/1989 | New et al. | 708/625 |
| 4,876,660 | 10/1989 | Owen et al. | 708/603 |
| 5,121,431 * | 6/1992 | Wiener | 708/625 |
| 5,764,558 * | 6/1998 | Pearson et al. | 708/625 |
| 5,771,186 * | 6/1998 | Kodali et al. | 708/625 |
| 5,784,305 | 7/1998 | Nadehara | 708/523 |
| 5,920,497 * | 7/1999 | Rim | 708/625 |

FOREIGN PATENT DOCUMENTS

| | | |
|---|---|---|
| 5216626 | 8/1993 | (JP) . |
| 830439 | 2/1996 | (JP) . |
| 8305550 | 11/1996 | (JP) . |
| 8328828 | 12/1996 | (JP) . |
| WO9714090 | 4/1997 | (WO) . |

OTHER PUBLICATIONS

Patent Abstracts of Japan, vol. 1996, No. 06, Jun. 28, 1996 & JP 08 030439 A (Matsushita Electric Industrial Co., Ltd.), Feb. 2, 1996.

* cited by examiner

*Primary Examiner*—David H. Malzahn
(74) *Attorney, Agent, or Firm*—Stevens, Davis, Miller & Mosher, L.L.P.

(57) ABSTRACT

In a binary fixed-point number system in which the most significant bit is a sign bit and the decimal point is between the most significant bit and a bit which is lower by one bit than the most significant bit, the circuit scale for digit place aligning means is reduced and a double-precision multiplication with an excellent efficiency is realized. Products of the high-order word/low-order word of a double-precision multiplicand and the high-order word/low-order word of a double-precision multiplier are obtained by using a single-precision multiplying device. A digit place alignment addition operation is performed on the obtained products to produce a double-precision multiplication result. In this case, at least two digits are set before the decimal point, thereby allowing each of the products of the high-order word/low-order word of the double-precision multiplicand and the high-order word/low-order word of the double-precision multiplier, to be obtained at a bit width which is larger by at least one bit than a bit width of double precision.

10 Claims, 10 Drawing Sheets

COMPUTING APPARATUS FOR DOUBLE-PRECISION MULTIPLICATION

BACKGROUND OF THE INVENTION

1. Field of the Invention

The invention relates to a computing method and a computing apparatus which executes a double-precision multiplication by using a single-precision multiplying device.

2. Description of the Prior Art

Conventionally, a double-precision multiplication system is known in which products of the high-order word/low-order word of a double-precision multiplicand and the high-order word/low-order word of a double-precision multiplier are obtained by using a single-precision multiplying device and a digit place alignment addition operation is performed on each of the products, thereby obtaining a double-precision multiplication result. This system is disclosed in, for example, Japanese patent publication (Kokai) No. HEI8-30439. In the prior art example disclosed in Japanese patent publication (Kokai) No. HEI8-30439, means for holding the most significant bit of low-word of a double-precision multiplier is disposed, and the most significant bit of the low-order word of the double-precision multiplier is used in the encoding of the high-order word of the double-precision multiplier, so that the low-order word of the double-precision multiplier is treated as a signed binary. In order to perform a multiplication of the low-order word of the double-precision multiplicand, the system is provided with multiplying means having a function of enabling a multiplication even when the multiplicand is an unsigned binary. Therefore, the prior art technique can realize a double-precision multiplication without impairing the precision.

In the prior art example disclosed in Japanese patent publication (Kokai) No. HEI8-30439, however, a sign indicative of a positive number is assumed at the bit which is higher by one bit than the most significant bit of a multiplicand, when the multiplying means treats the multiplicand as an unsigned binary. Therefore, the digit place of the sign of the multiplication result is different from that of a result of a multiplication in which the multiplicand is a signed binary. Consequently, the shift number for digit place alignment is different in additions of products of the high-order word/low-order word of a double-precision multiplicand and the high-order word/low-order word of a double-precision multiplier, and hence the prior art example has a problem in that the circuit scale for digit place aligning means becomes large.

SUMMARY OF THE INVENTION

It is an object of the invention to provide a computing method and a computing apparatus which can solve the problem, in which the circuit scale for digit place aligning means can be reduced, and which can realize a double-precision multiplication with an excellent efficiency.

The computing method of the invention is characterized in that, in a binary fixed-point number system in which a most significant bit is a sign bit and a decimal point is between the most significant bit and a one-bit lower bit, when products of a high-order word/low-order word of a double-precision multiplicand and a high-order word/low-order word of a double-precision multiplier are to be obtained by using a single-precision multiplying device, and a digit place alignment addition operation is to be performed on the obtained products to obtain a double-precision multiplication result, at least two digits are set before the decimal point, thereby allowing each of the products of the high-order word/low-order word of the double-precision multiplicand and the high-order word/low-order word of the double-precision multiplier, to be obtained at a bit width which is larger by at least one bit than a bit width of double precision.

When at least two digits are set before a decimal point as described above, the shift number for digit place alignment of each of the products obtained at a bit width which is larger by at least one bit than a bit width of double precision is relatively restricted to the same bit width. Therefore, the circuit scale for digit place aligning means can be reduced, and a double-precision multiplication can be efficiently realized.

By setting at least three digits before a decimal point, each of the products of the high-order word/low-order word of a double-precision multiplicand and the high-order word/low-order word of a double-precision multiplier may be obtained at a bit width which is larger by two, three, or more bits than a bit width of double precision. This is nothing but sign extension of a product obtained at a bit width which is larger by one bit, and hence results only in an increased circuit scale. Usually, it is therefore sufficient to set two digits before a decimal point so as to obtain products at a bit width which is larger by one bit than a bit width of double precision. Hereinafter, the computing method of the invention will be described under assumption that products of the high-order word/low-order word of a double-precision multiplicand and the high-order word/low-order word of a double-precision multiplier are obtained at a bit width which is larger by one bit than a bit width of double precision.

In the computing method, when a product of the low-order word of the double-precision multiplicand and the low-order word of the double-precision multiplier is to be obtained, for example, a data in which a sign bit indicative of a positive number is added to a digit that is higher by one bit than the most significant bit of the low-order word of the double-precision multiplicand is multiplied with a data in which the most significant bit of the low-order word of the double-precision multiplier is a sign bit, a value "0" is added to a digit which is lower by one bit than the least significant bit of a result of the multiplication, and a result of the addition is output as a desired product.

When a product of the high-order word of the double-precision multiplicand and the low-order word of the double-precision multiplier is to be obtained, for example, a data in which a sign bit of the most significant bit of the high-order word of the double-precision multiplicand is subjected to one-bit sign extension is multiplied with a data in which the most significant bit of the low-order word of the double-precision multiplier is a sign bit, a value "0" is added to a digit which is lower by one bit than the least significant bit of a result of the multiplication, and a result of the addition is output as a desired product.

When a product of the low-order word of the double-precision multiplicand and the high-order word of the double-precision multiplier is to be obtained, for example, a data in which a sign bit indicative of a positive number is added to a digit that is higher by one bit than the most significant bit of the low-order word of the double-precision multiplicand is multiplied with a data in which a data having the same value as that of the most significant bit of the low-order word of the double-precision multiplicand is added to a digit of the least significant bit of the high-order word of the double-precision multiplier, a value "0" is added to a digit which is lower by one bit than the least significant bit of a result of the multiplication, and a result of the addition is output as a desired product.

When a product of the high-order word of the double-precision multiplicand and the high-order word of the double-precision multiplier is to be obtained, for example, a data in which a sign bit of the most significant bit of the high-order word of the double-precision multiplicand is subjected to one-bit sign extension is multiplied with a data in which a data having the same value as that of the most significant bit of the low-order word of the double-precision multiplier is added to a digit of the least significant bit of the high-order word of the double-precision multiplier, a value "0" is added to a digit which is lower by one bit than the least significant bit of a result of the multiplication, and a result of the addition is output as a desired product.

A single-precision multiplying device which is usually used performs a multiplication of two single-precision numbers, and a multiplication result is obtained as a data of a bit width which is smaller than by one bit than a bit width of double precision. Because of the alignment of the decimal point and the output of a result at the bit width of double precision, a value "0" is added to a digit which is lower by one bit than the least significant bit of a multiplication result, and a data of double precision is output as a product.

A single-precision multiplying device which is used for obtaining products of the high-order word/low-order word of a double-precision multiplicand and the high-order word/low-order word of a double-precision multiplier performs sign extension on a digit which is higher by one bit than the most significant bit of the multiplicand or adds a sign bit indicative of a positive number. Consequently, the bit width of a multiplication result is equal to that of double precision. Even when sign extension is performed or a sign bit indicative of a positive number is added, however, the position of the decimal point of the multiplicand is unchanged. Therefore, a multiplication result obtained by the above-mentioned single-precision multiplying device has at least two digits before the decimal point, so that the result has a data which is larger by one bit than a multiplication result obtained by a conventional single-precision multiplying device. In the above-mentioned single-precision multiplier, in view of the relationships between digit places, a value "0" is added as described above to a digit which is lower by one bit than the least significant bit of a multiplication result, so that the result has two digits before the decimal point, thereby obtaining a product at a bit width which is larger than by one bit than a bit width of double precision.

The computing apparatus of the invention executes a double-precision multiplication by using a single-precision multiplying device which performs a multiplication of two signed binary fixed-point number data, and is characterized in that the apparatus comprises: MSB holding means for holding a most significant bit of a multiplier; data selecting means for selectively outputting one of a held data of the MSB holding means and a value "0"; multiplier encoding means for encoding the multiplier by using the multiplier and an output data of the data selecting means, and for outputting the encoded multiplier; multiplying means for, when a multiplicand judgement signal is inactive, obtaining a result of a multiplication of a multiplicand and an output data of the multiplier encoding means while performing one-bit sign extension on a sign bit which is a most significant bit of the multiplicand, and, when the multiplicand judgement signal is active, obtaining a result of a multiplication of the multiplicand and the output data of the multi- plier encoding means while adding a sign bit indicative of a positive number to a digit which is higher by one bit than the most significant bit of the multiplicand, and for outputting the multiplication result in which at least two digits exist before a decimal point and which hence has a bit width that is larger by at least one bit than a bit width of double precision; adding means for performing an addition of an addend which is an output data of the multiplying means and an augend having a bit width that is larger by at least one bit than a bit width of double precision, and for outputting an addition result having a bit width that is larger by at least one bit than a bit width of double precision; addition result holding means for holding the addition result output from the adding means; and digit place aligning means for selecting one of a held data of the addition result holding means and a value "0", for performing a digit place alignment operation, and for outputting a result of the operation as the augend for the adding means.

According to this configuration, the multiplying means outputs the multiplication result that has at least two digits before a decimal point and hence a bit width which is larger by at least one bit than a bit width of double precision. Therefore, the shift number for digit place alignment of each of the multiplication products is relatively restricted to the same bit width. Consequently, the circuit scale for the digit place aligning means can be reduced, and a double-precision multiplication can be efficiently realized.

In the computing apparatus, during an execution of a double-precision multiplication, for example, the MSB holding means operates so that, when a product of the low-order word of the double-precision multiplier and the high-order word/low-order word of the double-precision multiplicand is to be obtained, a most significant bit of the low-order word of the double-precision multiplier is held.

In the computing apparatus, during an execution of a double-precision multiplication, for example, the data selecting means operates so that, when a product of the low-order word of the double-precision multiplier and the high-order word/low-order word of the double-precision multiplicand is to be obtained, a value "0" is selectively output, and, when a product of the high-order word of the double-precision multiplier and the high-order word/low-order word of the double-precision multiplicand is to be obtained, the most significant bit of the low-order word of the double-precision multiplier which is held by the MSB holding means is selectively output.

In the computing apparatus, during an execution of a double-precision multiplication, for example, the multiplier encoding means operates so that, when a product of the low-order word of the double-precision multiplier and the high-order word/low-order word of the double-precision multiplicand is to be obtained, the input low-order word of the double-precision multiplier and the output data of the value "0" selected by the data selecting means are encoded in accordance with the Booth algorithm and then output, and, when a product of the high-order word of the double-precision multiplier and the high-order word/low-order word of the double-precision multiplicand is to be obtained, the output data of the most significant bit of the low-order word of the double-precision multiplier which is held by the MSB holding means and selected by the data selecting means is encoded in accordance with the Booth algorithm and then output.

In the computing apparatus, for example, the multiplying means comprises partial product generating means for, when the multiplicand judgement signal is active, judging that the input multiplicand is the low-order word of the double-precision multiplicand, and obtaining a partial product of the multiplicand and the output data of the multiplier encoding means while adding the sign bit indicative of a positive number to a digit which is higher by one bit than the most significant bit of the multiplicand, and for, when the multiplicand judgement signal is inactive, judging that the input multiplicand is the high-order word of the double-precision multiplicand, and obtaining a partial product of the multiplicand and the output data of the multiplier encoding means while performing one-bit sign extension on the sign bit which is the most significant bit of the multiplicand. The multiplying means may comprise at least two sets of the partial product generating means, sum partial products which are output data of the plural partial product generating means, while aligning a digit place, add a data of a value "0" to a digit which is lower by one bit than the least significant bit of a result of the partial product summation, and output a result of the addition as a desired product. In the computing apparatus, multiplication result holding means for temporarily holding the output data of the multiplying means and outputting the held data as the addend for the adding means may be disposed, and the multiplying means and the adding means may be operable in parallel. According to this configuration, the operation time can be shortened.

In the computing apparatus, the multiplier encoding means may have a function of compulsorily setting the least significant bit of the multiplier which is an input data, to be a value "0", and the multiplying means may have a function of compulsorily setting the least significant bit of the multiplicand which is an input data, to be a value "0".

An object of the invention is to efficiently execute a double-precision multiplication of a high precision. In some of applications which are currently practically used, standards are defined so as to use a double-precision multiplication of a low precision. For example, such applications include a voice encoding process which is used in a digital portable telephone.

Since the functions of respectively compulsorily setting the least significant bits of the multiplier and the multiplicand to be a value "0" are provided as described above, compatibility with an application using a double-precision multiplication of a low precision can be attained.

In this specification, a double-precision multiplication of a low precision means a double-precision multiplication in which, when a multiplication using data such as the low-order word of the double-precision multiplier and the low-order word of the double-precision multiplicand is to be performed during an execution of the double-precision multiplication, data in each of which the low-order word of the double-precision multiplier or the low-order word of the double-precision multiplicand is right-shifted by one bit and the sign bit indicative of a positive number is added to a digit of the most significant bit are previously produced, and the multiplication is performed while using these data in place of the data of the low-order word of the double-precision multiplier and the low-order word of the double-precision multiplicand. The sign bits of the double-precision multiplier and the double-precision multiplicand respectively correspond to the most significant bits of the high-order word of the double-precision multiplier and the high-order word of the double-precision multiplicand. The low-order word of the double-precision multiplier and the low-order word of the double-precision multiplicand are data which do not have a sign bit and which consist of data bits only.

A usual single-precision multiplying device which handles signed binary fixed-point numbers is not configured so as to handle data which consist of data bits only. To comply with this, since the low-order word of the double-precision multiplier and the low-order word of the double-precision multiplicand are deemed to be positive data, a sign bit indicative of a positive number is added to the data. When no further countermeasure is taken, the bit width is larger by one bit than a bit width of single precision. Therefore, the data of the least significant bits are discarded by performing a one-bit right-shifting operation, thereby suppressing the bit width to that of single precision. In other words, the data of the least significant bits of the low-order word of the double-precision multiplier and the low-order word of the double-precision multiplicand are discarded, and hence the precision is impaired by the degree corresponding to the discard. The displacement of the digit place caused by the one-bit right-shifting operation is absorbed in the digit place alignment operation in the addition of the products of the high-order word/low-order word of the double-precision multiplier and the high-order word/low-order word of a double-precision multiplicand.

In the computing apparatus, the MSB holding means may be realized by means for selectively holding one of the most significant bit of the multiplier and a value "0", in place of the means for holding the most significant bit of the multiplier which is a signed binary. According to this configuration, commands can be commonly used in both a multiplication of a double-precision data and a double-precision data, and that of a double-precision data and a single-precision data, and hence the number of commands can be reduced.

BRIEF DESCRIPTION OF THE DRAWINGS

FIG. 5 is a diagram illustrating a digit alignment bit shift in the prior a

DESCRIPTION OF THE PREFERRED EMBODIMENTS

[First Embodiment]

Figure 1:
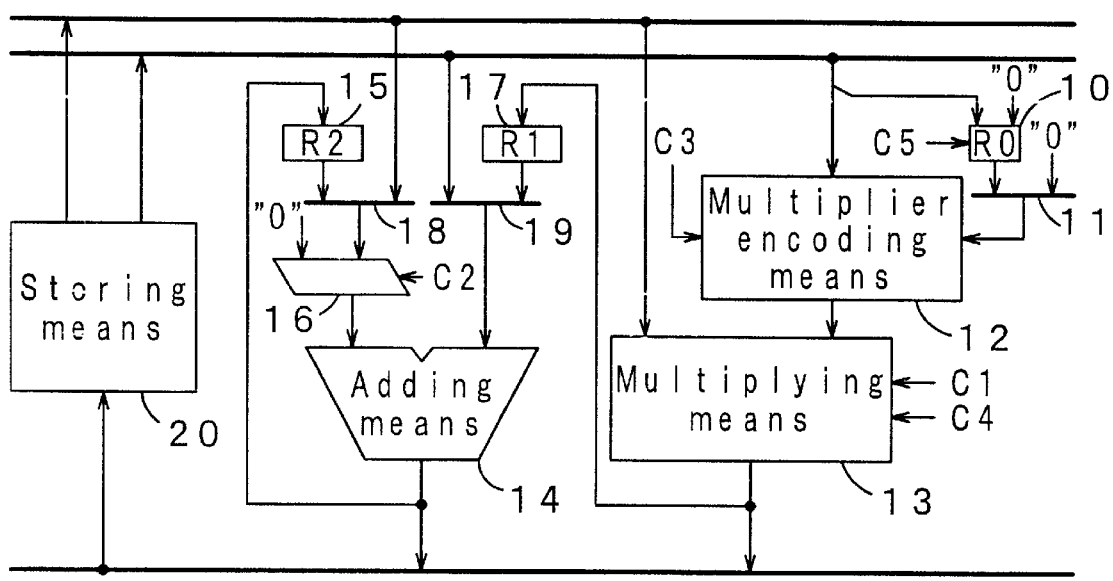
FIG. 1 is a block diagram showing the configuration of a computing apparatus which is a first embodiment of the invention.

Hereinafter, a first embodiment of the invention will be described with reference to the accompanying drawings. FIG. 1 is a diagram showing the configuration of a computing apparatus which is an embodiment of the invention.

Referring to FIG. 1, MSB holding means 10 holds the most significant bit of a multiplier which is a signed binary fixed-point number. Data selecting means 11 selectively outputs one of the output of the MSB holding means 11 and a value "0". Multiplier encoding means 12 encodes the multiplier and the output of the data selecting means 11 in accordance with the secondary Booth algorithm.

Multiplying means 13 receives a multiplicand which is a signed binary fixed-point number, the output of the multiplier encoding means 12, and a multiplicand judgement signal C1. When the multiplicand judgement signal C1 has a value "0" or is inactive, the multiplying means judges that the multiplicand is the high-order word of a double-precision multiplicand, and obtains a result of a multiplication of the multiplicand and the output data of the multiplier encoding means 12 while performing one-bit sign extension on a sign bit which is the most significant bit of the multiplicand. By contrast, when the multiplicand judgement signal C1 has a value "1" or is active, the multiplying means judges that the multiplicand is the low-order word of a double-precision multiplicand, and obtains a result of a multiplication of the multiplicand and the output data of the multiplier encoding means 12 while adding a sign bit of a value "0" serving as a sign indicative of a positive number to a digit which is higher by one bit than the most significant bit of the multiplicand. A data in which a data of a value "0" is added to a digit which is lower by one bit than the least significant bit of the obtained multiplication result is output as a product which has at least two digits before the decimal point and hence has a bit width that is larger by at least one bit than a bit width of double precision.

In the invention, it is assumed that a single-precision data and a double-precision data are expressed by the binary fixed-point number system in which the most significant bit is a sign bit and the decimal point is between the most significant bit and a bit which is lower by one bit than the most significant bit. Usually, only one bit serving as the sign bit exists before the decimal point. In other words, the expression "have at least two digits before a decimal point" and that "have a bit width that is larger by at least one bit than a bit width of double precision" have the same meaning.

Adding means 14 performs an addition of an addend which is the output of the multiplying means 13 and an augend having at least two digits before the decimal point and hence having a bit width that is larger by at least one bit than a bit width of double precision, and outputs an addition result having at least two digits before the decimal point and hence having a bit width that is larger by at least one bit than a bit width of double precision. Addition result holding means 15 holds the output of the adding means 14. When a digit place alignment signal C2 is (C2-1, C2-0)=(0, 1), digit place aligning means 16 outputs the output of the addition result holding means 15 without performing a shifting operation. When the digit place alignment signal C2 is (C2-1, C2-0)=(1, 0), the digit place aligning means outputs the output of the addition result holding means 15 with right-shifting the output by 16 bits. When the digit place alignment signal C2 is (C2-1, C2-0)=(0, 0), the digit place aligning means selects a value "0" and outputs the value.

The symbols C2-1 and C2-0 indicate bit components of the digit place alignment signal C2, respectively. The reference numeral 20 designates storing means serving as a source and a destination of operation commands which are to be executed in the computing apparatus of the invention.

The following description is made under the assumption that multiplication result holding means 17 and selecting means 18 and 19 are not used so that the output of the multiplying means 13 is directly supplied to the adding means 14 and that of the addition result holding means 15 is directly supplied to the digit place aligning means 16. The multiplication result holding means 17 and the selecting means 18 and 19 will be described later.

In FIG. 1, a multiplier control signal C3 which is supplied to the multiplier encoding means 12, and a multiplicand control signal C4 which is supplied to the multiplying means 13 are required in a second embodiment but not in the first embodiment. Furthermore, a value "0" and a held data select signal C5 which are supplied to the MSB holding means 10 are required in a third embodiment but not in the first embodiment.

The operation of the thus configured computing apparatus will be described. For the sake of simplicity, it is assumed that a 16-bit signed binary fixed-point number is a single-precision data and a 32-bit signed binary fixed-point number is a double-precision data.

Hereinafter, a multiplication of a double-precision data and a double-precision data will be described. A double-precision multiplicand consists of a high-order word XH and a low-order word XL, and a double-precision multiplier consists of a high-order word YH and a low-order word YL. The data selecting means 11 selects the value "0" when a multiplication is to be performed on the low-order word YL of the double-precision multiplier, and selects the output of the MSB holding means 10 when a multiplication is to be performed on the high-order word YH of the double-precision multiplier. The multiplicand judgement signal C1 is a signal which, when a multiplication is to be performed on the low-order word XL of the double-precision multiplicand, has a value "1" or is active, and, when a multiplication is to be performed on the high-order word XH of the double-precision multiplicand, has a value "0" or is inactive.

First, a product of the low-order word XL of the double-precision multiplicand and the low-order word YL of the double-precision multiplier (hereinafter, referred to as XL×YL) is obtained. The low-order word YL of the double-precision multiplier is supplied to the multiplier encoding means 12, and the most significant bit of the word is held in the MSB holding means 10. The data selecting means 11 selects the value "0" and outputs the selected value to the multiplier encoding means 12. The multiplier encoding means 12 encodes the low-order word YL of the double-precision multiplier and the output data of the data selecting means 11 in accordance with the Booth algorithm. The value "0" which is the output of the data selecting means 11 is used for encoding the lower two bits of the low-order word YL of the double-precision multiplier. The multiplicand judgement signal C1 has a value "1" or is active. Namely, the signal indicates that the input multiplicand is the low-order word XL of the double-precision multiplicand. In response to the multiplicand judgement signal C1, the multiplying means 13 adds a sign bit of a value "0" serving as a sign indicative of a positive number to a digit which is higher by one bit than the most significant bit of the low-order word XL of the double-precision multiplicand, and obtains a product of the resulting data and the output of the multiplier encoding means 12. The obtained product is output at a 32-bit width.

At this time, the digit place alignment signal C2 is (C2–1, C2–0)=(0, 0), and the digit place aligning means 16 selects the value "0" and outputs the value. The adding means 14 outputs a result of an addition of the product XL×YL which is the output of the multiplying means 13, and a value "0" which is the output of the digit place aligning means 16. The addition result holding means 15 holds the product XL×YL which is the output of the adding means 14.

Next, a product of the high-order word XH of the double-precision multiplicand and the low-order word YL of the double-precision multiplier (hereinafter, referred to as XH×YL) is obtained. The low-order word YL of the double-precision multiplier is supplied to the multiplier encoding means 12, and the most significant bit of the word is held in the MSB holding means 10. The data selecting means 11 selects the value "0" and outputs the selected value to the multiplier encoding means 12. The multiplier encoding means 12 encodes the low-order word YL of the double-precision multiplier and the output data of the data selecting means 11 in accordance with the Booth algorithm. The value "0" which is the output of the data selecting means 11 is used for encoding the lower two bits of the low-order word YL of the double-precision multiplier. The multiplicand judgement signal C1 has a value "0" or is inactive. Namely, the signal indicates that the input multiplicand is the high-order word XH of the double-precision multiplicand. In response to the multiplicand judgement signal C1, the multiplying means 13 performs one-bit sign extension on the sign bit which is the most significant bit of the high-order word XH of the double-precision multiplicand, and obtains a product of the resulting data and the output of the multiplier encoding means 12. The obtained product is output at a 32-bit width.

At this time, the digit place alignment signal C2 is (C2–1, C2–0)=(1, 0), and the digit place aligning means 16 selects the product XL×YL which is held in the addition result holding means 15 and outputs the product while right-shifting the product by 16 bits in order to perform the digit place alignment. The adding means 14 outputs a result of an addition of the product XH×YL which is the output of the multiplying means 13, and the product XL×YL which is the output of the digit place aligning means 16. The addition result holding means 15 holds XL×YL+XH×YL which is the output of the adding means 14.

Next, a product of the low-order word XL of the double-precision multiplicand and the high-order word YH of the double-precision multiplier (hereinafter, referred to as XL×YH) is obtained. The high-order word YH of the double-precision multiplier is supplied to the multiplier encoding means 12. The data selecting means 11 selects the output of the MSB holding means 10 and outputs the data of the most significant bit of the low-order word YL of the double-precision multiplier which is held by the MSB holding means 10, to the multiplier encoding means 12. The multiplier encoding means 12 encodes the high-order word YH of the double-precision multiplier and the output data of the data selecting means 11 in accordance with the Booth algorithm. The data of the most significant bit of the low-order word YL of the double-precision multiplier is used for encoding the lower two bits of the high-order word YH of the double-precision multiplier. The multiplicand judgement signal C1 has a value "1" or is active. Namely, the signal indicates that the input multiplicand is the low-order word XL of the double-precision multiplicand. In response to the multiplicand judgement signal C1, the multiplying means 13 adds a sign bit of a value "0" serving as a sign indicative of a positive number to a digit which is higher by one bit than the most significant bit of the low-order word XL of the double-precision multiplicand, and obtains a product of the resulting data and the output of the multiplier encoding means 12. The obtained product is output at a 32-bit width.

At this time, the digit place alignment signal C2 is (C2–1, C2–0)=(0, 1), and the digit place aligning means 16 selects the product XL×YL+XH×YL which is held in the addition result holding means 15 and outputs the product. The adding means 14 outputs a result of an addition of the product XL×YH which is the output of the multiplying means 13, and XL×YL+XH×YL which is the output of the digit place aligning means 16. The addition result holding means 15 holds XL×YL+XH×YL+XL×YH which is the output of the adding means 14.

Finally, a product of the high-order word XH of the double-precision multiplicand and the high-order word YH of the double-precision multiplier (hereinafter, referred to as XH×YH) is obtained. The high-order word YH of the double-precision multiplier is supplied to the multiplier encoding means 12. The data selecting means 11 selects the output of the MSB holding means 10 and outputs the data of the most significant bit of the low-order word YL of the double-precision multiplier which is held by the MSB holding means 10, to the multiplier encoding means 12. The multiplier encoding means 12 encodes the high-order word YH of the double-precision multiplier and the output data of the data selecting means 11 in accordance with the Booth algorithm. The data of the most significant bit of the low-order word YL of the multiplier which is the output of the data selecting means 11 is used for encoding the lower two bits of the high-order word YH of the multiplier. The multiplicand judgement signal C1 has a value "0" or is inactive. Namely, the signal indicates that the input multiplicand is the high-order word XH of the double-precision multiplicand. In response to the multiplicand judgement signal C1, the multiplying means 13 performs one-bit sign extension on the sign bit which is the most significant bit of the high-order word XH of the double-precision multiplicand, and obtains a product of the resulting data and the output of the multiplier encoding means 12. The obtained product is output at a 32-bit width.

At this time, the digit place alignment signal C2 is (C2–1, C2–0)=(1, 0), and the digit place aligning means 16 selects the product XL×YL+XH×YL+XL×YH which is held in the addition result holding means 15 and outputs the product while right-shifting the product by 16 bits in order to perform the digit place alignment. The adding means 14 performs an addition of the product XH×YH which is the output of the multiplying means 13, and XL×YL+XH×YL+XL×YH which is the output of the digit place aligning means 16, and outputs a result of the addition. The addition result XL×YL+XH×YL+XL×YH+XH×YH which is the output of the adding means 14 is the desired product of the double-precision multiplication.

In the embodiment, when products of the high-order word XH/low-order word XL of a double-precision multiplicand and the high-order word YH/low-order word YL of a double-precision multiplier are to be obtained and a digit place alignment addition operation is to be performed, at least one product of the low-order word YL of the double-precision multiplier is obtained and the most significant bit of the low-order word YL of the double-precision multiplier is held in the MSB holding means 10, before a product of the high-order word YH of the double-precision multiplier is obtained. In the embodiment, the order of performing the multiplication for obtaining the products XH×YL and XL×YH and the digit place alignment addition operation may be inverted. In a multiplication of a double-precision data and a single-precision data, the single-precision data may be deemed as a double-precision data in which there is no low-order word, and the process of obtaining a product of the low-order word of this double-precision data may be omitted. In other words, the multiplication can be performed in the same manner as a multiplication of a double-precision data and a double-precision data.

In the above, the description has been made under the assumption that the multiplication result holding means 17 and the selecting means 18 and 19 are not used. Alternatively, the multiplication result holding means 17 for holding a multiplication result may be disposed between the multiplying means 13 and the adding means 14 so that the multiplication operation and the addition operation are performed in parallel. The selecting means 18 and 19 shown in FIG. 1 are used for supplying data from a bus when a multiplying device and a double-precision adding device are to be independently operated, and hence are not directly related to the invention.

Hereinafter, the internal configuration and operation of the components of the embodiment will be further described in detail with reference to FIGS. 2 to 10.

Figure 2:
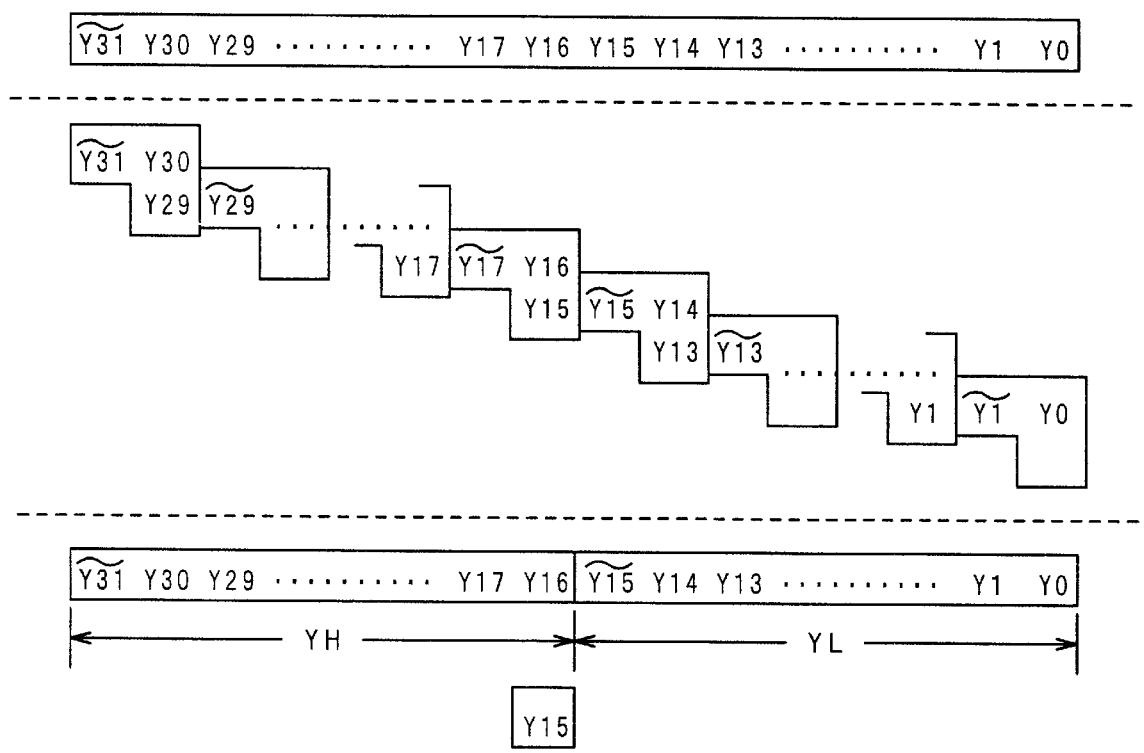
FIG. 2 is diagram illustrating data division of a double-precision multiplier.

FIG. 2 is diagram illustrating data division of a double-precision multiplier during[]an execution of a double-precision multiplication. In FIG. 2, a waveform symbol affixed to a bit indicates that the bit has a negative weight. The data string shown in the upper stage shows a double-precision multiplier. The symbols Y31 to Y0 indicate data of digits, respectively. The most significant bit Y31 is a sign bit and has a negative weight. The terms "have a negative weight" mean a value "−1" when the bit is 1, and a value "0" when the bit is 0. The middle stage shows a diagram showing a modification of the double-precision multiplier based on the Booth algorithm. The three data in one box indicate encoded values of one booth and have a value in the range of −2 to +2 at an even digit. Since an object of the invention is to efficiently execute a double-precision multiplication of a high precision by using a single-precision multiplying device, a double-precision multiplier cannot be encoded by one operation in accordance with the Booth algorithm. Therefore, the data at the interface of the high-order and low-order words of the double-precision multiplier is considered. It will be seen that, when Y15 which is the most significant bit of the low-order word of the double-precision multiplier can be used in the operation of encoding the high-order word of the double-precision multiplier, the encoding of the double-precision multiplier can be satisfactorily executed. The lower stage shows the data supply of a double-precision multiplier in the invention. A calculation of obtaining a product of the low-order word of the double-precision multiplier is first performed. During this calculation, Y15 which is the most significant bit of the low-order word of the double-precision multiplier is held. When a product of the high-order word of the double-precision multiplier is to be then obtained, the most significant bit Y15 of the low-order word of the double-precision multiplier which has been held is used in the operation of encoding the high-order word of the double-precision multiplier. In FIG. 2, YH and YL indicate the high-order and low-order words of the double-precision multiplier, respectively.

Figure 3:
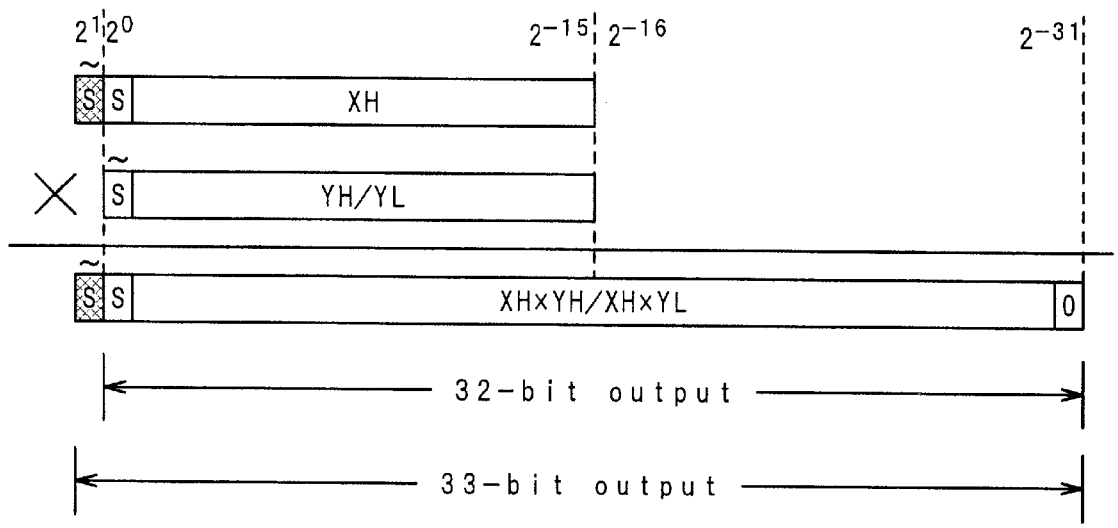
FIG. 3 is a diagram illustrating a data output format of a product of the high-order word of a multiplicand and the high-order word/low-order word of a multiplier.

FIG. 3 is a diagram illustrating a data output format in an execution of a multiplication of the high-order word XH of the double-precision multiplicand and the high-order word YH/low-order word YL of the double-precision multiplier. In FIG. 3, the waveform symbol affixed to a bit indicates that the bit has a negative weight, and the symbol S indicates a sign bit. When there is a masked S, the masked symbol S indicates a sign bit which has undergone one-bit sign extension, and the symbol S at the digit which is lower by one bit than the masked symbol S indicates that the bit is not a sign bit but a data bit having the same value as the sign bit. The symbol 0 indicates that a value "0" is added as a data. The values $2^1$, $2^0$, $2^{-1}$, ..., $2^{-31}$ shown in the top indicate scaling of the respective digits.

When a normal multiplication of two single-precision data is performed, the desired multiplication result is a 31-bit data which has a sign bit at the digit of $2^0$ and data bits at the digits of $2^{-1}$ to $2^{-30}$. Therefore, a value "0" is added to the digit of $2^{-31}$ and the result is output as a 32-bit double-precision data.

In the invention, the high-order word YH of the multiplicand has undergone one-bit sign extension, and the desired multiplication result is obtained as a data in which the sign bit at the digit of $2^0$ is one-bit sign-extended to the digit of $2^1$. When this result is output at a bit width of 32 bits, it is preferable to perform the output in the range indicated by 32-bit output" in FIG. 3, in order to attain the match of the output with the data output in an execution of the above-described multiplication of single-precision data. In this case, the digit of $2^0$ serves as a sign bit. In the invention, a data having a bit width which is larger by at least one bit than a bit width of double precision is output by setting at least two digits to exist before the decimal point. A data may be output at a bit width of 2, 3, or more bits. This is nothing but sign extension of a product obtained at a bit width which is larger by one bit, and hence results only in an increased circuit scale. Hereinafter, the description will be therefore made under assumption that at least two digits exist before the decimal point so that the desired product is obtained at a bit width of 33 bits which is larger by one bit than that of double precision.

When a data of a double-precision multiplier is divided as shown in FIG. 2, the most significant bit Y15 of the low-order word YL of the double-precision multiplier can be treated as a data having a negative weight. When a product of the high-order word XH of the double-precision multiplicand and the low-order word YL of the double-precision multiplier is to be obtained, therefore, the low-order word YL of the double-precision multiplier can be encoded as it is in accordance with the Booth algorithm. By contrast, when a product of the high-order word XH of the double-precision multiplicand and the high-order word YH of the double-precision multiplier is to be obtained, the data of the most significant bit Y15 of the low-order word YL of the double-precision multiplier is used in the operation of encoding the high-order word YH of the double-precision multiplier. Because of the above, in FIG. 3, the low-order word YL of the double-precision multiplier is expressed in the same manner as a signed binary fixed-point number of single precision. In the case of a multiplication of the high-order word YH of the double-precision multiplier, the data of the most significant bit Y15 of the low-order word YL of the double-precision multiplier must be shown in the figure. The object of this description is to illustrate the data output format. For the sake of simplicity, therefor, the data is not shown in the figure.

Figure 4:
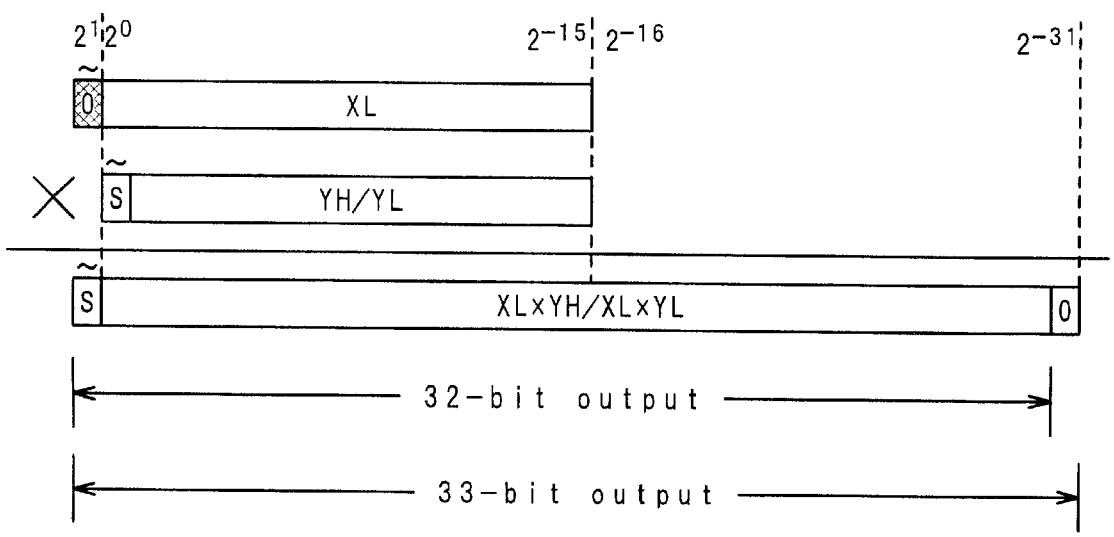
FIG. 4 is a diagram illustrating a data output format of a product of the low-order word of a multiplicand and the high-order word/low-order word of a multiplier.

FIG. 4 is a diagram illustrating a data output format in an execution of a multiplication of the low-order word XL of the double-precision multiplicand and the high-order word YH/low-order word YL of the double-precision multiplier.

In FIG. 4, the waveform symbol affixed to a bit indicates that the bit has a negative weight, and the symbol S indicates a sign bit. The symbol 0 indicates that a value "0" is added as a data. The values $2^1$, $2^0$, $2^{-1}$, . . . , $2^{-31}$ shown in the top indicate scaling of the respective digits.

In the invention, the most significant bit of the low-order word of the double-precision multiplicand is a data bit, and hence a sign bit of a value "0" is added as a sign indicative a positive number to a digit which is higher by one bit. The desired multiplication result is a 32-bit data which has a sign bit at the digit of $2^1$ and data bits at the digits of $2^0$ to $2^{-30}$. When this result is to be output at a bit width of 32 bits, the output must be performed in the range indicated by "32-bit output" in FIG. 4. When this output range is compared with the "32-bit output" range shown in FIG. 3, it will be seen that each of the output digit positions is shifted by one digit. In other words, it will be seen that means for, when "32-bit output" is to be done, switching over the output range is required. On the other hand, in the invention, since a data having a bit width of 33 bits which is larger by one bit than a bit width of double precision is output by setting at least two digits to exist before the decimal point, a data can be output in the relationship of the digit positions which is strictly identical with that of "33-bit output" shown in FIG. 3. Since a data obtained in the multiplication does not exist at the digit of $2^{-31}$ as described in conjunction with FIG. 3, the result is output while adding a value "0" to the digit of $2^{-31}$.

As in the case of FIG. 3, the low-order word YL of the double-precision multiplier is expressed in the same manner as a signed binary fixed-point number of single precision. In the case of a multiplication of the high-order word YH of the double-precision multiplier, the data of the most significant bit Y15 of the low-order word YL of the double-precision multiplier must be shown in the figure. The object of this description is to illustrate the data output format. For the sake of simplicity, therefor, the data is not shown in the figure.

Figure 5:
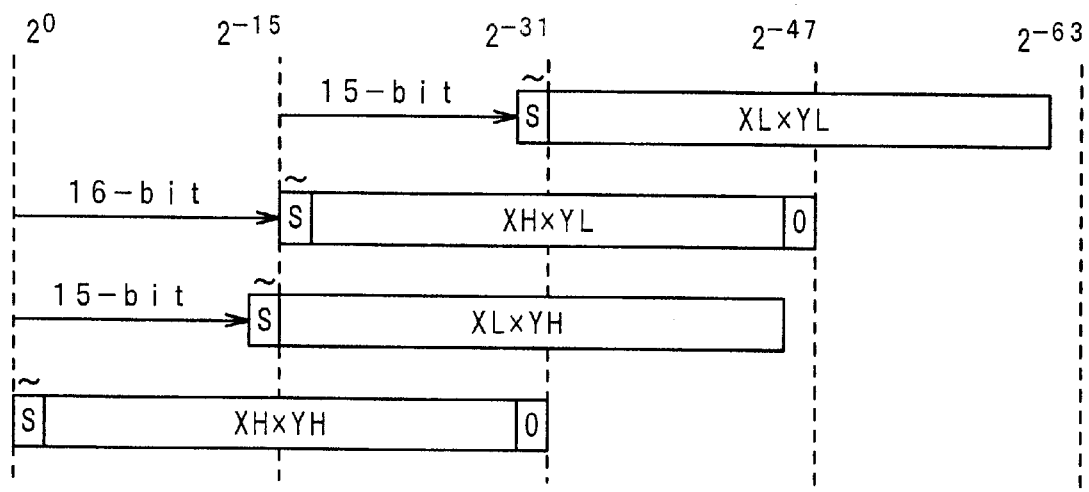

FIG. 5 is a diagram illustrating a digit alignment bit shift in the prior art in which a multiplication result is output at a bit width of 32 bits. When a data is output at a bit width of 32 bits as shown in FIGS. 3 and 4, the relationship of the digit positions in a product of the high-order word XH of a double-precision multiplicand is shifted by one bit from that of a product of the low-order word XL of the double-precision multiplicand. As shown in FIG. 5, therefore, digit place alignment in the case where a result of a double-precision multiplication is to be obtained must be performed with different shift numbers.

Figure 6:
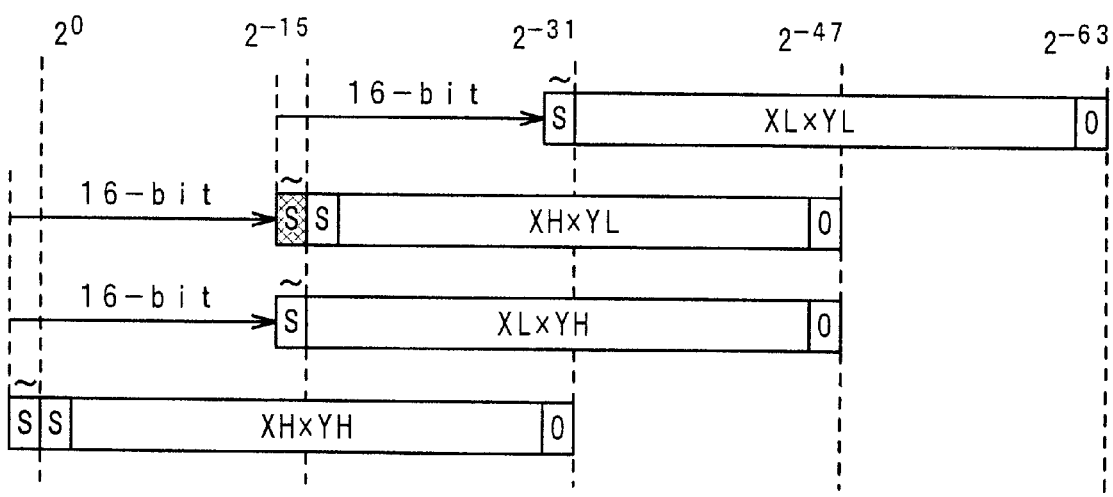
FIG. 6 is a diagram illustrating a digit alignment bit shift in the first embodiment of the invention.

FIG. 6 is diagram illustrating a digit alignment bit shift in the invention in which a multiplication result is output at a bit width of 33 bits. When a data is output at a bit width of 33 bits, the relationship of the digit positions in a product of the high-order word XH of a double-precision multiplicand is relatively identical with that of a product of the low-order word XL of the double-precision multiplicand. As shown in FIG. 6, therefore, it will be seen that the shift number for digit place alignment in the case where a result of a double-precision multiplication is to be obtained is relatively restricted to the bit width of single precision. Consequently, the circuit scale of the digit place aligning means 16 can be made smaller than that of the prior art example in which a multiplication result is output at a bit width of 32 bits.

Figure 7:
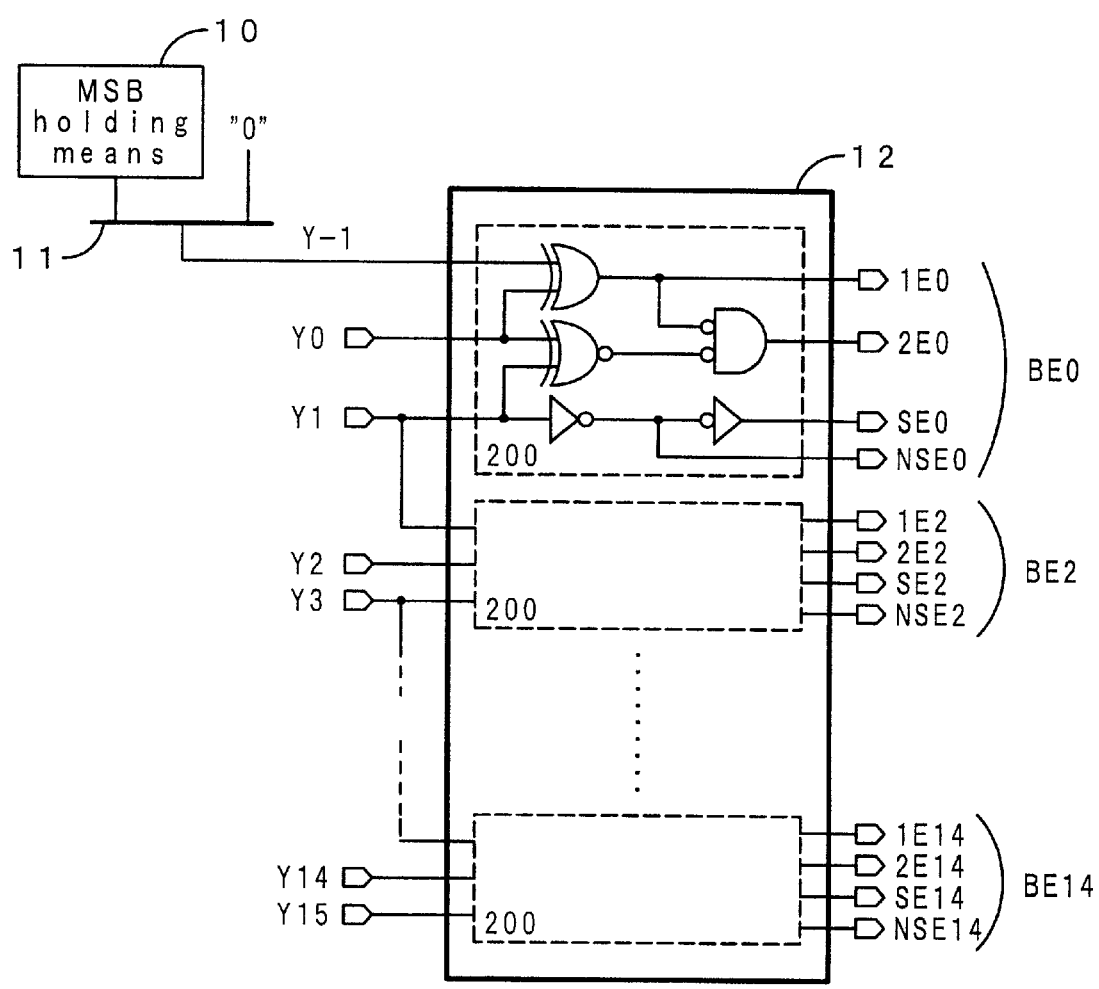
FIG. 7 is a circuit diagram showing the circuit configuration of multiplier encoding means.

FIG. 7 is a circuit diagram showing the circuit configuration of the multiplier encoding means 12. In FIG. 7, 200 designates Booth encoding means for generating one encoded value. A multiplier is encoded in accordance with the secondary Booth algorithm. An encode result BEi has either of five values, −2, −1, 0, 1, and 2. Each of the values is expressed by three bits of 1Ei, 2Ei, and SEi. The absolute value of each value is indicated by two bits of 2Ei and 1Ei, and the sign of the value is indicated by SEi in which 1 is set when the value is negative. NSEi is an inverted signal of SEi which is used for generating a partial product. In the embodiment, i is 0, 2, 4, 6, 8, 10, 12, or 14, and the output of the data selecting means 11 is supplied as Y-1.

Figure 8:
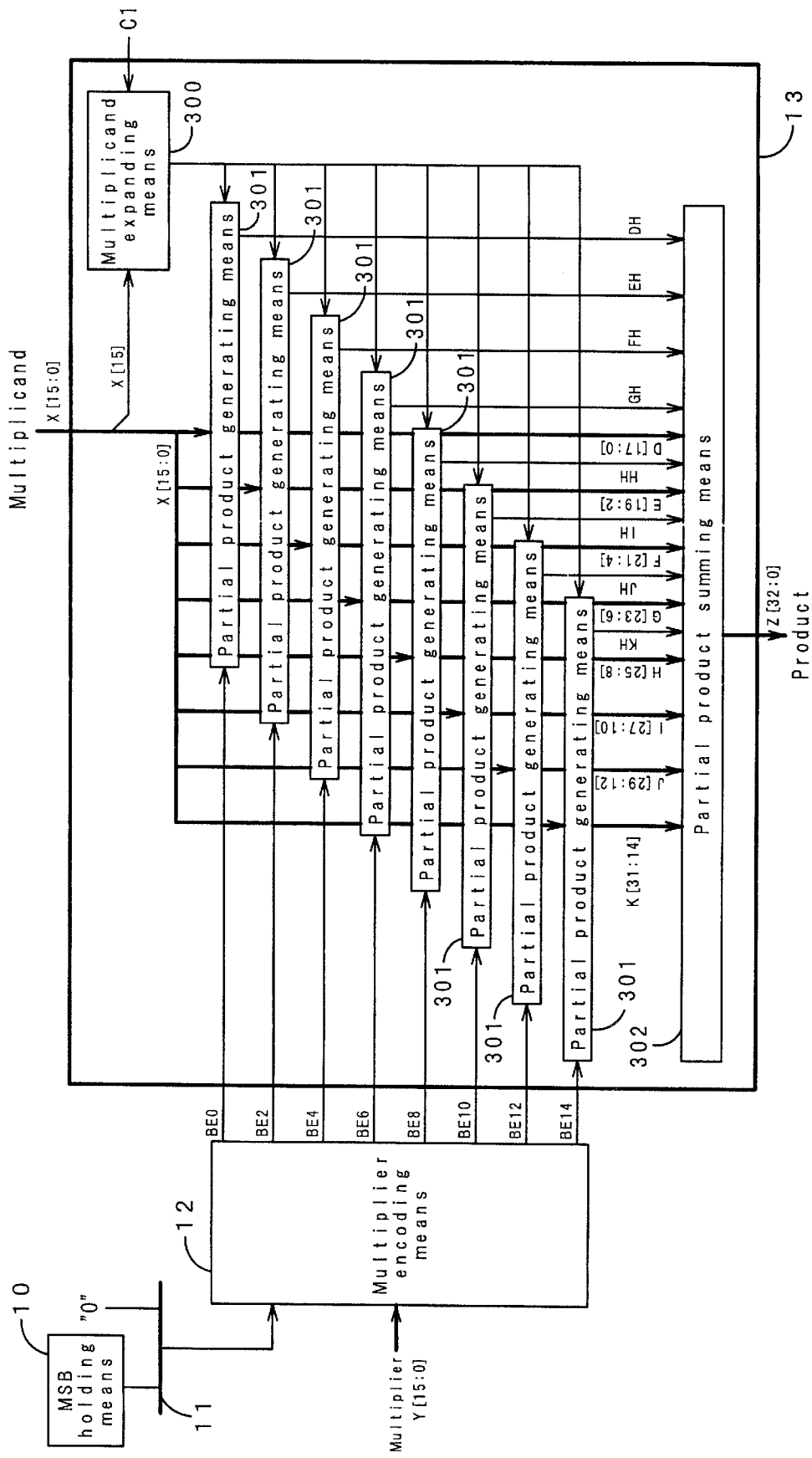
FIG. 8 is a block diagram showing the configuration of multiplying.

FIG. 8 is a block diagram showing the configuration of the multiplying means 13. In FIG. 8, 300 designates multiplicand expanding means, 301 designates partial product generating means, and 302 designates partial product summing means. The multiplicand expanding means 300 outputs the most significant bit X[15] of the multiplicand when the multiplicand judgement signal C1 has a value "0", and outputs a value "0" when the multiplicand judgement signal C1 has a value "1". The partial product generating means 301 generates partial products from the outputs of the multiplier encoding means 12 and the multiplicand expanding means 300, and the multiplicand X. The partial product summing means 302 performs a summation of the partial products generated by the partial product generating means 301, to obtain a multiplication result. Since no data obtained as a result of the multiplication exists at the digit which is the least significant bit or bit 0, the summation result is output while adding a value "0" to the digit.

Figure 9:
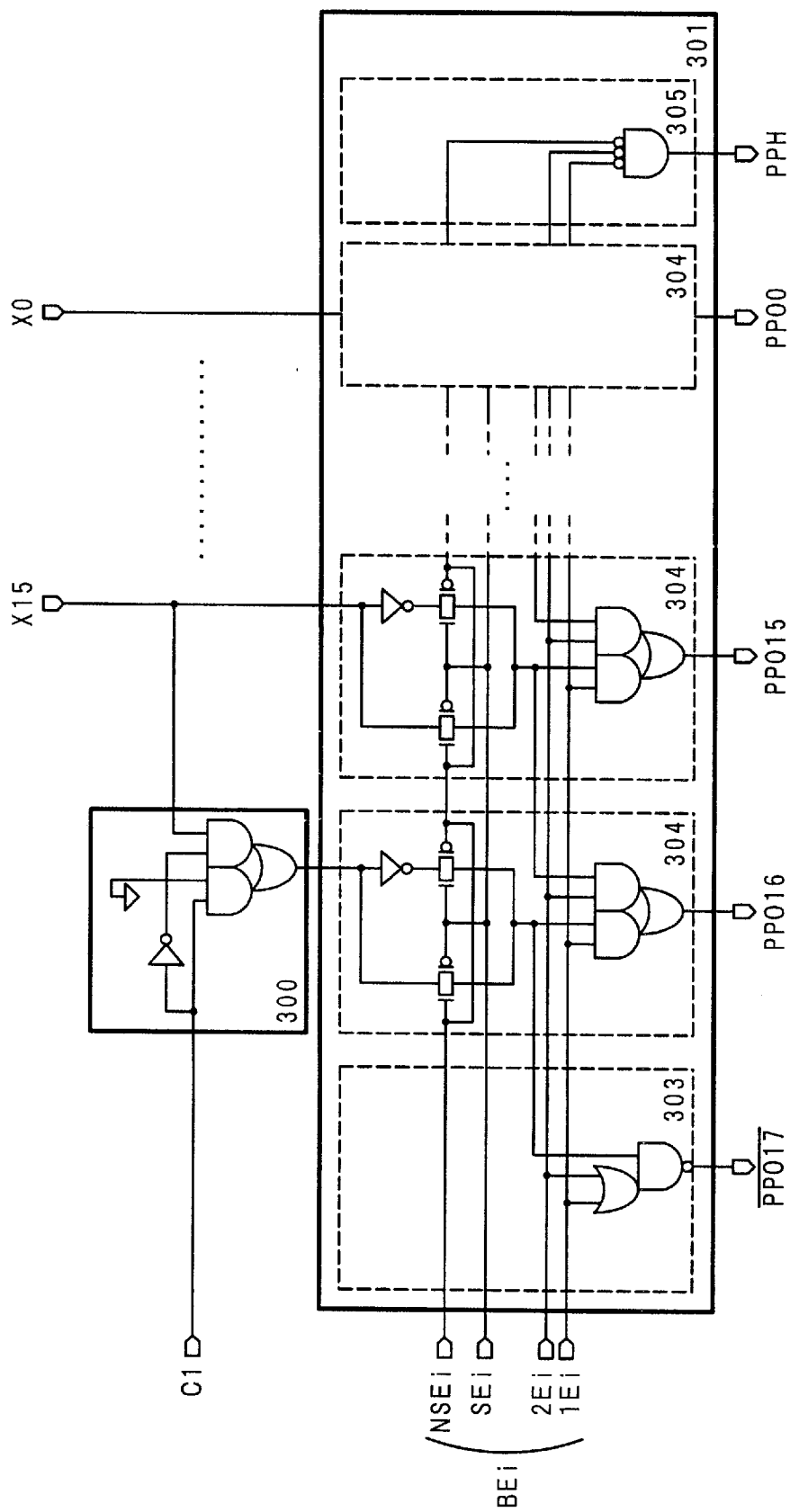
FIG. 9 is a circuit diagram showing the circuit configuration of multiplicand expanding means and partial product generating means of the multiplying means.

FIG. 9 is a circuit diagram showing the circuit configuration of the multiplicand expanding means 300 and the partial product generating means 301 of the multiplying means 13. In FIG. 9, 303 designates a partial product sign bit inversion generating circuit which generates a bit inversion of the sign bit of a generated partial product, 304 designates a partial product generating circuit for each bit, and 305 designates a partial product correction term generating circuit which generates a correction term PPH. When the multiplicand judgement signal C1 has a value "0", the sign bit of the multiplicand is output as it is to a digit which is higher by one bit than the most significant bit of the multiplicand, and, when the multiplicand judgement signal C1 has a value "1", a value "0" is output to the digit. When the encode result BEi is positive, the multiplicand which has undergone sign extension is selected as it is, and, when the encode result is negative, the bit inversion is selected. A composite gate outputs the selected value of the corresponding bit when the encode result BEi is 1 or −1, outputs the selected value of the one-bit lower bit when the encode result BEi is 2 or −2, and outputs 0 when the encode result BEi is 0. The output of each composite gate is an output PP0n of a bit n of a partial product to be generated. The correction term PPH for complementation of 2 is generated by NANDing the control signals NSEi, 2Ei, and 1Ei. This is true when the encode result BEi is −1 or −2. The correction term is output to the digit of the least significant bit of the partial product to be generated.

Figure 10:
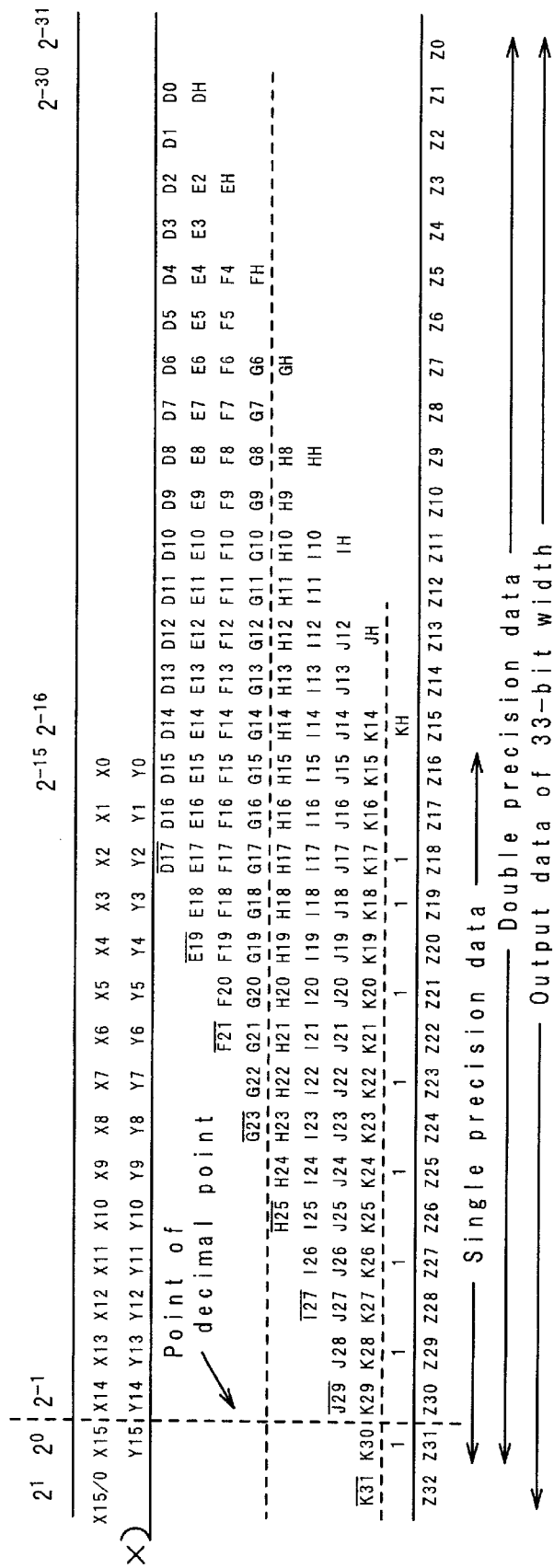
FIG. 10 is a diagram illustrating a multiplying operation.

FIG. 10 is a diagram illustrating a multiplying operation. In FIG. 10, symbols D, E, F, G, H, I, J, and K indicate eight generated partial products, respectively, and a symbol Z indicates a product of the multiplicand X and the multiplier Y. The values $2^1$, $2^0$, $2^{-1}$, . . . , $2^{-31}$ shown in the top of FIG. 10 indicate scaling of the respective digits. A bar above a symbol indicative of a data indicates a bit inversion. A value "1" shown in FIG. 10 is a data which is to be added in place of sign extension.

An operation equivalent to sign extension which must be performed for digit place alignment in a summation of partial products is conducted by the bit inversion of the sign bit of each partial product which is indicated by the bar, and addition of the value "1" shown in FIG. 10. This method is frequently employed in the prior art, and hence is not described in detail in the specification. In the multiplying means 13, as shown in FIG. 10, partial products are generated by the partial product generating means 301, and then summed by the partial product summing means 302. Because of the position of the decimal point, the relationships between the numbers affixed to respective partial product components in FIG. 10 are shifted by one bit with respect to those affixed to components of the output data Z. Since each partial product does not have a data at the digit of $2^{-31}$, a value "0" is always output at Z0.

Commands are listed in Table 1 which are used in execution of a multiplication of a double-precision data and a double-precision data, and that of a double-precision data and a single-precision data in the computing apparatus of the embodiment wherein the multiplication result holding means 17 for holding a multiplication result is disposed between the multiplying means 13 and the adding means 14.

TABLE 1

| Command | Encoding operation | Multiplying operation (one cycle) | Adding operation (two cycles) |
| --- | --- | --- | --- |
| Double-precision data × double-precision data | | | |
| A | YL[15] → R0 read 0 | XL × YL → R1 | 0 + R1 → R2 |
| B | YL[15] → R0 read 0 | XH × YL → R1 | rshift (R2) + R1 → R2 |
| C | read R0 (YL[15]) | XL × YH → R1 | R2 + R1 → R2 |
| D | read R0 (YL[15]) | XH × YH → R1 | rshift (R2) + R1 → R2 |
| Double-precision data × single-precision data | | | |
| E | read 0 | XL × YH → R1 | 0 + R1 → R2 |
| F | read 0 | XH × YH → R1 | rshift (R2) + R1 → R2 |

Table 1

1 double-precision data×double-precision data
2 command
3 encoding operation
4 multiplying operation (one cycle)
5 adding operation (two cycles)
6 double-precision data×single-precision data Four products XL×YL, XH×YL, XL×YH, and XH×YH are sequentially obtained by executing the commands A to D shown in Table 1 in sequence, and these products are subjected to a digit place alignment addition operation, thereby executing a multiplication of the double-precision data and the double-precision data. Two products XL×YH and XH×YH are sequentially obtained by executing the commands E and F shown in Table 1 in sequence, and these products are subjected to a digit place alignment addition operation, thereby executing a multiplication of the double-precision data and the single-precision data. Table 1 shows data flows and contents of the multiplier encoding operation which is performed by the MSB holding means 10, the data selecting means 11, and the multiplier encoding means 12, the multiplying operation which is performed by the multiplying means 13, and the adding operation which is performed by the adding means 14 and the digit place aligning means 16. In Table 1, R0 indicates the MSB holding means 10, R1 the multiplication result holding means 17, and R2 the addition result holding means 15.

In Table 1, each command is a two-cycle command. The column of the encoding operation shows a storage of data into the MSB holding means 10, and a data which is selected by the data selecting means 11. The description in parentheses (YL[15] in the commands C and D) shows a data which is held in the MSB holding means 10 during an execution of the corresponding command. The column of the multiplying operation shows a multiplication result obtained by the multiplying means 13. The column of the adding operation shows a data which is selected by the digit place aligning means 16, the presence or absence of a 16-bit right-shift operation for digit place alignment, and an addition result which is obtained in the adding means 14.

As described above, according to the first embodiment, the multiplication result of the multiplying means 13 is output at a bit width which is larger by at least one bit than a bit width of double precision, for example, at a bit width of 33 bits, by setting at least two digits to exist before the decimal point. Therefore, the shift number for digit place alignment is relatively restricted to the bit width of single precision. Consequently, the circuit scale of the digit place aligning means 16 can be made smaller than that of the prior art example. Specifically, one-bit right-shifting means which is required for outputting at 32-bit precision a result of a multiplication in which the low-order word of a multiplicand is used as the source is not necessary.

When the multiplication result holding means 17 is disposed and the multiplying means 13 and the adding means 14 are operated in parallel, the operation time can be shortened.

[Second Embodiment]

Hereinafter, a second embodiment of the invention will be described.

The second embodiment is configured so that, in the first embodiment, the multiplier encoding means 12 has a function of compulsorily setting the least significant bit of the input multiplier when the multiplier control signal C3 has a value "1", to be a value "0", and the multiplying means 13 has a function of compulsorily setting the least significant bit of the input multiplicand when the multiplicand control signal C4 has a value "1", to be a value "0".

Figure 11:
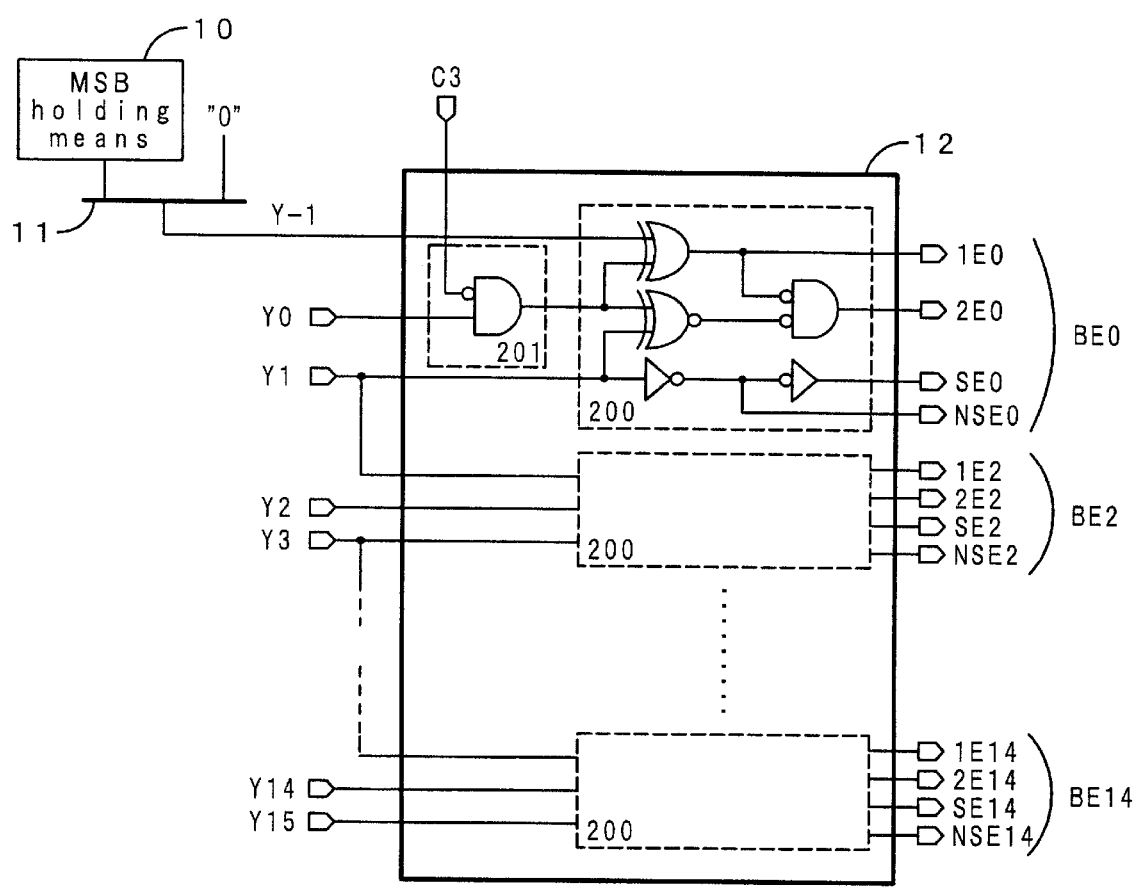
FIG. 11 is a circuit diagram showing the circuit configuration of multiplier encoding means in a second embodiment of the invention.

FIG. 11 is a circuit diagram showing the circuit configuration of the multiplier encoding means 12 in the second embodiment. In FIG. 11, 201 designates multiplier controlling means for, when the multiplier control signal C3 has a value "1", compulsorily setting the least significant bit of the multiplier to be a value "0". In the multiplier controlling means 201, when the multiplier control signal C3 has a value "1", Y0 which is the least significant bit of the multiplier is compulsorily set to be a value "0" by ANDing the least significant bit Y0 of the multiplier and a logical inversion of the multiplier control signal C3.

Figure 12:
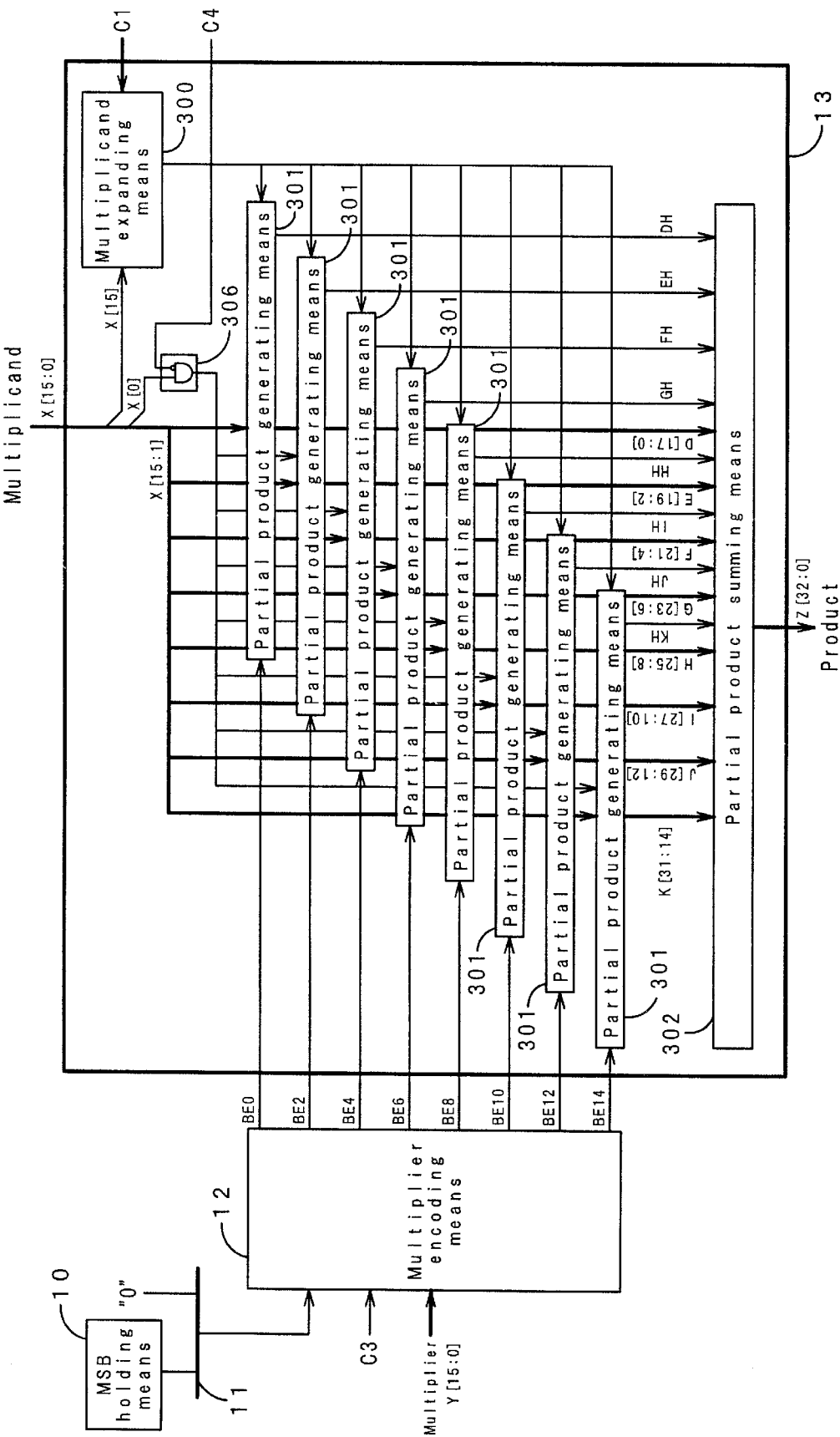
FIG. 12 is a block diagram showing the configuration of multiplying means in the second embodiment of the invention.

FIG. 12 is a block diagram showing the configuration of the multiplying means 13 in the second embodiment. In FIG. 12, 306 designates multiplicand controlling means for, when the multiplicand control signal C4 has a value "1", compulsorily setting the least significant bit of the multiplicand to be a value "0". In the multiplicand controlling means 306, when the multiplicand control signal C4 has a value "1", X0 which is the least significant bit of the multiplicand is compulsorily set to be a value "0" by ANDing the least significant bit X0 of the multiplicand and a logical inversion of the multiplicand control signal C4.

The operation of the thus configured computing apparatus will be described.

When a double-precision multiplication is to be performed by using a single-precision multiplying device, the following method is often used. In order to treat each of the low-order word of a multiplier and the low-order word of a multiplicand as a signed binary fixed-point number of single precision, a one-bit right-shifting operation is performed and a sign bit of a value "0" serving as a sign indicative of a positive number is added to the most significant bit, and the least significant bit is discarded. Therefore, a result of a multiplication of a double-precision data and a double-precision data has 31-bit×31-bit precision, and that of a multiplication of a double-precision data and a single-precision data has 31-bit×16-bit precision.

In the first embodiment, a multiplication of a double-precision data and a double-precision data can be executed at 32-bit×32-bit precision, and a multiplication of a double-precision data and a single-precision data can be executed at 32-bit×16-bit precision. In the second embodiment, double-precision multiplications of 31-bit×31-bit precision and 31-bit×16-bit precision can be executed by adding a small number of circuits to the configuration of the first embodiment, or adding the multiplier controlling means 201 to the multiplier encoding means 12, and the multiplicand controlling means 306 to the multiplying means 13.

When the second embodiment is employed, the computing apparatus of the invention is provided with a function of compulsorily setting the least significant bit of each of a multiplier and a multiplicand to be a value "0", whereby compatibility with an application using a double-precision multiplication of a low precision can be attained.

[Third Embodiment]

Hereinafter, a third embodiment of the invention will be described.

The third embodiment is configured so that, in the first embodiment, the MSB holding means 10 has a function of, when the held data select signal C5 has a value "1", selecting and holding the most significant bit of a multiplier, and, when the held data select signal C5 has a value "0", selecting and holding the value "0".

Commands are listed in Table 2 which are used in execution of a multiplication of a double-precision data and a double-precision data, and that of a double-precision data and a single-precision data in the computing apparatus of the embodiment in which the multiplication result holding means 17 for holding a multiplication result is disposed between the multiplying means 13 and the adding means 14.

TABLE 2

| Command | Encoding operation | Multiplying operation (one cycle) | Adding operation (two cycles) |
|---|---|---|---|
| Double-precision data × double-precision data |||| 
| A | 0 → R0 read 0 | XL × YL → R1 | 0 + R1 → R2 |
| B | YL[15] → R0 read 0 | XH × YL → R1 | rshift (R2) + R1 → R2 |
| C | read R0 (YL[15]) | XL × YH → R1 | R2 + R1 → R2 |
| D | read R0 (YL[15]) | XH × YH → R1 | rshift (R2) + R1 → R2 |
| Double-precision data × single-precision data ||||
| A (E) | 0 → R0 read 0 | XL × YH → R1 | 0 + R1 → R2 |
| D (F) | read R0 (0) | XH × YH → R1 | rshift (R2) + R1 → R2 |

Table 2

Four products XL×YL, XH×YL, XL×YH, and XH×YH are sequentially obtained by executing the commands A to D shown in Table 2 in sequence, and these products are subjected to a digit place alignment addition operation, thereby executing a multiplication of the double-precision data and the double-precision data. Two products XL×YH and XH×YH are sequentially obtained by executing the commands A(E) and D(F) shown in Table 2 in sequence, and these products are subjected to a digit place alignment addition operation, thereby executing a multiplication of the double-precision data and the single-precision data. Table 2 shows data flows and contents of the multiplier encoding operation which is performed by the MSB holding means 10, the data selecting means 11, and the multiplier encoding means 12, the multiplying operation which is performed by the multiplying means 13, and the adding operation which is performed by the adding means 14 and the digit place aligning means 16. In Table 2, R0 indicates the MSB holding means 10, R1 the multiplication result holding means 17, and R2 the addition result holding means 15.

In Table 2, each command is a two-cycle command. The column of the encoding operation shows a storage of data into the MSB holding means 10, and a data which is selected by the data selecting means 11. The description in parentheses (YL[15]) in the commands C and D and 0 in the command D (F)) shows a data which is held in the MSB holding means 10 during an execution of the corresponding command. The column of the multiplying operation shows a multiplication result obtained by the multiplying means 13. The column of the adding operation shows a data which is selected by the digit place aligning means 16, the presence or absence of a 16-bit right-shift operation for digit place alignment, and an addition result which is obtained in the adding means 14.

When the table is compared with Table 1 above, the command A in Table 2 causes the data to be stored into the MSB holding means 10, to be a value "0". According to this configuration, a combination of the commands A and D can realize a multiplication of a double-precision data and a single-precision data. According to the third embodiment, therefore, the number of commands which are required in a multiplication of a double-precision data and a double-precision data and that of a double-precision data and a single-precision data can be reduced by commonly using commands.

What is claimed is:

1. A computing apparatus which executes a double-precision multiplication by using a single-precision multiplying device which performs a multiplication of two signed binary fixed-point number data, wherein said apparatus comprises:

MSB holding means for holding a most significant bit of a multiplier;

data selecting means for selectively outputting one of a held data of said MSB holding means and a value "0";

multiplier encoding means for encoding the multiplier by using the multiplier and an output data of said data selecting means, and for outputting the encoded multiplier;

multiplying means for receiving a multiplicand, an output data of said multiplier encoding means, and a multiplicand judgement signal, for, when the multiplicand judgement signal is inactive, obtaining a result of a multiplication of the multiplicand and the output data of said multiplier encoding means while performing one-bit sign extension on a sign bit which is a most significant bit of the multiplicand, and, when the multiplicand judgement signal is active, obtaining a result of a multiplication of the multiplicand and the output data of said multiplier encoding means while adding a sign bit indicative of a positive number to a digit which is higher by one bit than the most significant bit of the multiplicand, and for outputting the multiplication result in which at least two digits exist before a decimal point and which hence has a bit width that is larger by at least one bit than a bit width of double precision;

adding means for performing an addition of an addend which is an output data of said multiplying means and an augend having a bit width that is larger by at least one bit than a bit width of double precision, and for outputting an addition result in which at least two digits exist before a decimal point and which hence has a bit width that is larger by at least one bit than a bit width of double precision;

addition result holding means for holding the addition result output from said adding means; and digit place aligning means for selecting one of a held data of said addition result holding means and a value "0", for performing a digit place alignment operation, and for outputting a result of the operation as the augend for said adding means.

2. A computing apparatus according to claim 1, wherein, during an execution of a double-precision multiplication, when a product of the low-order word of the double-precision multiplier and the high-order word/low-order word of the double-precision multiplicand is to be obtained, said MSB holding means holds a most significant bit of the low-order word of the double-precision multiplier.

3. A computing apparatus according to claim 1, wherein, during an execution of a double-precision multiplication, when a product of the low-order word of the double-precision multiplier and the high-order word/low-order word of the double-precision multiplicand is to be obtained, said data selecting means selectively outputs a value "0", and, when a product of the high-order word of the double-precision multiplier and the high-order word/low-order word of the double-precision multiplicand is to be obtained, selectively outputs the most significant bit of the low-order word of the double-precision multiplier which is held by said MSB holding means.

4. A computing apparatus according to claim 1, wherein, during an execution of a double-precision multiplication, when a product of the low-order word of the double-precision multiplier and the high-order word/low-order word of the double-precision multiplicand is to be obtained, said multiplier encoding means encodes the input low-order word of the double-precision multiplier and the output data of the value "0" selected by said data selecting means, in accordance with the Booth algorithm and then outputs the encoded word and data, and, when a product of the high-order word of the double-precision multiplier and the high-order word/low-order word of the double-precision multiplicand is to be obtained, encodes the output data of the most significant bit of the low-order word of the double-precision multiplier which is held by said MSB holding means and selected by said data selecting means is encoded in accordance with the Booth algorithm and then outputs the encoded data.

5. A computing apparatus according to claim 1, wherein said multiplying means comprises partial product generating means for, when the multiplicand judgement signal is active during an execution of a double-precision multiplication, judging that the input multiplicand is the low-order word of the double-precision multiplicand, and obtaining a partial product of the multiplicand and the output data of said multiplier encoding means while adding the sign bit indicative of a positive number to a digit which is higher by one bit than the most significant bit of the multiplicand, and for, when the multiplicand judgement signal is inactive, judging that the input multiplicand is the high-order word of the double-precision multiplicand, and obtaining a partial product of the multiplicand and the output data of said multiplier encoding means while performing one-bit sign extension on the sign bit which is the most significant bit of the multiplicand.

6. A computing apparatus according to claim 1, wherein said multiplying means comprises at least two sets of partial product generating means, sums partial products which are output data of said plural partial product generating means, while aligning a digit place, adds a data of a value "0" to a digit which is lower by one bit than the least significant bit of a result of the partial product summation, and outputs a result of the addition as a desired product.

7. A computing apparatus according to claim 1, wherein said apparatus further comprises multiplication result holding means for temporarily holding the output data of said multiplying means and outputting the held data as the addend for said adding means, and said multiplying means and said adding means are operable in parallel.

8. A computing apparatus according to claim 1, wherein said multiplier encoding means has a function of compulsorily setting the least significant bit of the multiplier which is an input data, to be a value "0".

9. A computing apparatus according to claim 1, wherein said multiplying means has a function of compulsorily setting the least significant bit of the multiplicand which is an input data, to be a value "0".

10. A computing apparatus according to claim 1, wherein said MSB holding means is realized by means for selectively holding one of the most significant bit of the multiplier and a value "0", in place of means for holding the most significant bit of the multiplier.

* * * * *